US012455584B2

(12) United States Patent
Hsieh

(10) Patent No.: US 12,455,584 B2
(45) Date of Patent: Oct. 28, 2025

(54) LOW-DROPOUT REGULATOR

(71) Applicant: MEDIATEK INC., Hsinchu (TW)

(72) Inventor: Hung-Yi Hsieh, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 256 days.

(21) Appl. No.: 18/305,495

(22) Filed: Apr. 24, 2023

(65) Prior Publication Data

US 2023/0400871 A1 Dec. 14, 2023

Related U.S. Application Data

(60) Provisional application No. 63/350,915, filed on Jun. 10, 2022.

(51) Int. Cl.
*G05F 1/59* (2006.01)
*G05F 1/563* (2006.01)

(52) U.S. Cl.
CPC ................ *G05F 1/59* (2013.01); *G05F 1/563* (2013.01)

(58) Field of Classification Search
CPC .................................. G05F 1/59; G05F 1/563
See application file for complete search history.

(56) References Cited

U.S. PATENT DOCUMENTS

| | | | | |
|---|---|---|---|---|
| 7,109,695 | B2 | 9/2006 | King | |
| 7,342,387 | B1 | 3/2008 | Li | |
| 10,649,479 | B2 | 5/2020 | Heo | |
| 10,845,831 | B2 | 11/2020 | Liu et al. | |
| 11,372,437 | B2 | 6/2022 | Bauer | |
| 2012/0025612 | A1* | 2/2012 | Tsai | H02J 9/005 307/52 |
| 2014/0084896 | A1 | 3/2014 | Zhang | |
| 2014/0266103 | A1* | 9/2014 | Wang | G05F 1/565 323/275 |
| 2019/0212762 | A1* | 7/2019 | Heo | G05F 1/575 |
| 2019/0317536 | A1* | 10/2019 | Liu | G05F 1/467 |
| 2021/0149422 | A1* | 5/2021 | Perez | G05F 1/575 |
| 2021/0293083 | A1* | 9/2021 | Tarng | F24F 11/89 |

(Continued)

FOREIGN PATENT DOCUMENTS

| | | | |
|---|---|---|---|
| CN | 101111811 | A | 1/2008 |
| CN | 101414194 | A | 4/2009 |
| CN | 102541023 | A | 7/2012 |

(Continued)

OTHER PUBLICATIONS

Translation of CN114253331A, Feb. 2025 by Clarivate Analytics, 8 pages.*

(Continued)

*Primary Examiner* — Harry R Behm
(74) *Attorney, Agent, or Firm* — McClure, Qualey & Rodack, LLP

(57) ABSTRACT

A low-dropout (LDO) regulator having an analog low-dropout (ALDO) regulating circuit assisted by a digital low-dropout (DLDO) regulating circuit is shown. The DLDO regulating circuit is coupled to the ALDO regulating circuit, and senses operating information that shows if the ALDO regulating circuit is within its operating region. The DLDO regulating circuit assists the ALDO regulating circuit based on the operating information of the ALDO regulating circuit instead of an output voltage at the output terminal of the LDO regulator.

14 Claims, 5 Drawing Sheets

(56) References Cited

U.S. PATENT DOCUMENTS

2022/0415231 A1* 12/2022 Lee .......................... G09G 3/20

FOREIGN PATENT DOCUMENTS

| | | | | |
|---|---|---|---|---|
| CN | 106774587 | A | | 5/2017 |
| CN | 110022062 | A | | 7/2019 |
| CN | 113273069 | A | | 8/2021 |
| CN | 114253331 | A | * | 3/2022 |
| WO | 2021/133162 | A1 | | 7/2021 |

OTHER PUBLICATIONS

Chinese language office action dated Mar. 4, 2024, issued in application No. TW 112120318.

Liu, X. et al.; "A Modular Hybrid LDO with Fast Load-Transient Response and Programmable PSRR in 14nm CMOS Featuring Dynamic Clamp Tuning and Time-Constant Compensation"; 2019 IEEE International Solid- State Circuits Conference—(ISSCC); Feb. 2019; pp. 233-236.

Extended European Search Report dated Oct. 31, 2023, issued in application No. EP 23177356.5.

Liu, X., et al.; "A Dual-Rail Hybrid Analog/Digital LDO with Dynamic Current Steering for Tunable High PSRR and High Efficiency;" IEEE; Aug. 2020; pp. 1-2.

* cited by examiner

LOW-DROPOUT REGULATOR

CROSS REFERENCE TO RELATED APPLICATIONS

This application claims the benefit of U.S. Provisional Application No. 63/350,915, filed Jun. 10, 2022, the entirety of which is incorporated by reference herein.

BACKGROUND OF THE INVENTION

Field of the Invention

The present invention relates to a low-dropout (LDO) regulator.

Description of the Related Art

A low-dropout (LDO) regulator regulates the output voltage (Vout) even when the voltage source (AVDD) is very close to the output voltage (Vout).

As the voltage source (AVDD) drops lower and lower, some issues should be considered in the design of LDO regulators. These issues include the power supply rejection ratio (PSRR), the tradeoff between PSRR and quiescent current, and the tradeoff between the PSRR and the loop bandwidth.

A low power and high-efficiency LDO regulator is called for.

BRIEF SUMMARY OF THE INVENTION

A low-dropout (LDO) regulator in accordance with an exemplary embodiment of the present invention includes an analog low-dropout (ALDO) regulating circuit, and a digital low-dropout (DLDO) regulating circuit assisting the ALDO regulating circuit. Specifically, the DLDO regulating circuit is coupled to the ALDO regulating circuit, and senses operating information that shows if the ALDO regulating circuit is within its operating region. The DLDO regulating circuit assists the ALDO regulating circuit based on the operating information of the ALDO regulating circuit instead of an output voltage (Vout) at the output terminal of the LDO regulator.

In an exemplary embodiment, the DLDO regulating circuit senses the current of the power MOS of the ALDO regulating circuit to assist the ALDO regulating circuit based on the current of the power MOS of the ALDO regulating circuit. In an exemplary embodiment, the LDO regulator further includes a current-sensing MOS and a current-sensing resistor. The current-sensing MOS has a source terminal coupled to a source terminal of the power MOS, and a gate terminal coupled to a gate terminal of the power MOS. The current-sensing resistor is coupled at the drain terminal of the current-sensing MOS. A connection terminal between the current-sensing MOS and the current-sensing resistor is coupled to the DLDO regulating circuit, and thereby the DLDO regulating circuit senses the current of the power MOS.

In an exemplary embodiment, the DLDO regulating circuit senses the gate voltage of the power MOS of the ALDO regulating circuit to assist the ALDO regulating circuit based on the gate voltage of the power MOS of the ALDO regulating circuit.

In an exemplary embodiment, the DLDO regulating circuit receives a sensed voltage (Vsense) that represents the operating information of the ALDO regulating circuit. The DLDO regulating circuit has a controller. When determining that the sensed voltage (Vsense) is greater than an upper limit voltage (VH), the controller controls the DLDO regulating circuit to modify the output current (e.g., to reinforce the DLDO regulating circuit to increase the output current) to a load coupled to the output terminal of the LDO regulator until the sensed voltage (Vsense) is lower than a medium threshold voltage (VM). The medium threshold voltage (VM) is lower than the upper limit voltage (VH).

In an exemplary embodiment, when determining that the sensed voltage (Vsense) is lower than a lower limit voltage (VL), the controller controls the DLDO regulating circuit to modify the output current (e.g. to weaken the DLDO regulating circuit to decrease the output current) to the load until the sensed voltage (Vsense) is greater than the medium threshold voltage (VM). The medium threshold voltage (VM) is greater than the lower limit voltage (VL).

In an exemplary embodiment, the DLDO regulating circuit further has an analog-to-digital converter (ADC). The ADC converts the sensed voltage (Vsense) into a digital code. According to the digital code, the controller changes the current that the DLDO regulating circuit provides to a load coupled to the output terminal of the LDO regulator.

In an exemplary embodiment, the ALDO regulating circuit has a capacitor array providing an adaptive capacitance between the voltage source (AVDD) and the gate terminal of the power MOS of the ALDO regulating circuit. The greater the current that the DLDO regulating circuit provides to the load coupled to the output terminal of the LDO regulator, the smaller the capacitance that the capacitor array provides between the voltage source (AVDD) and the gate terminal of the power MOS.

In an exemplary embodiment, the DLDO regulating circuit has an array of power switches which passes an adaptive current to a load coupled to the output terminal of the LDO regulator, and each power switch is coupled to a PMOS that mirrors a constant current to the corresponding power switch. In an exemplary embodiment, the DLDO regulating circuit further has a capacitor coupled between the voltage source (AVDD) and the gate terminals of the PMOS s.

In an exemplary embodiment, the DLDO regulating circuit has an array of power switches which passes an adaptive current to a load coupled to the output terminal of the LDO regulator. The ALDO regulating circuit has an operational amplifier, having a negative input terminal receiving a reference voltage (Vref), a positive input terminal receiving the output voltage (Vout), and an output terminal coupled to a gate terminal of the power MOS of the ALDO regulating circuit. The power MOS of the ALDO regulating circuit is coupled between the voltage source (AVDD) and the output terminal of the LDO regulator.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
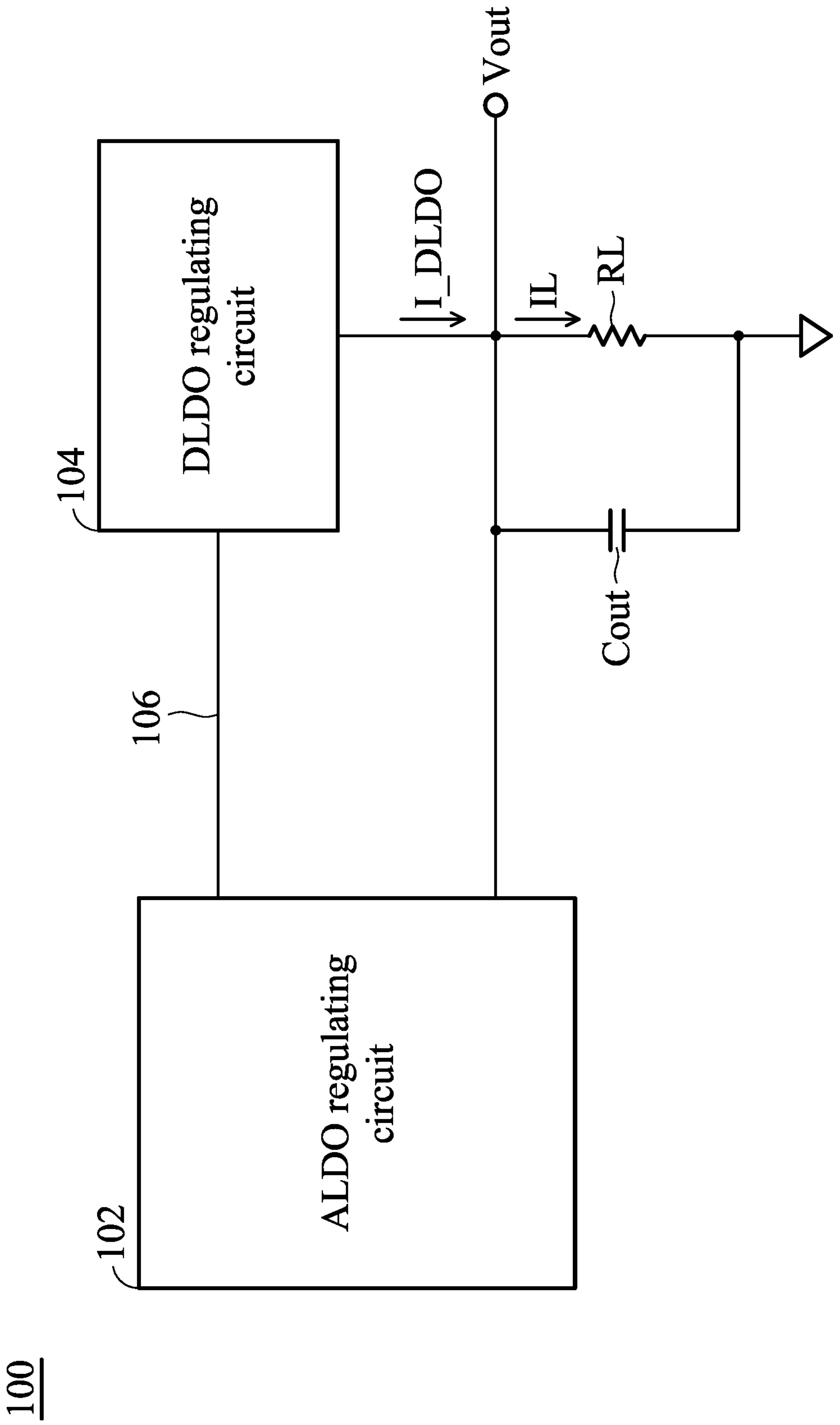
FIG. 1 depicts a low-dropout (LDO) regulator 100 in accordance with an exemplary embodiment of the present invention, which drives a load RL and may has an output capacitor Cout.

FIG. 1 depicts a low-dropout (LDO) regulator 100 in accordance with an exemplary embodiment of the present invention, which drives a load RL and may have an output capacitor Cout.

The LDO regulator 100 has an analog low-dropout (ALDO) regulating circuit 102 and a digital low-dropout (DLDO) regulating circuit 104 assisting the ALDO regulating circuit 102. In response to a heavy load, the DLDO regulating circuit 104 is reinforced to provide the larger current I_DLDO to increase the load current IL. In response to a light load, the DLDO regulating circuit 104 is weakened to provide less current I_DLDO, and the ALDO regulating circuit 102 mainly contributes the load current IL. Note that the DLDO regulating circuit 104 is coupled to the ALDO regulating circuit 102 to sense information 106 about the operating information of the ALDO regulating circuit 102 (e.g., to determine whether the ALDO regulating circuit 102 is within its operating region). The DLDO regulating circuit 104 assists the ALDO regulating circuit 102 based on the operating information of the ALDO regulating circuit 102 instead of an output voltage Vout at the output terminal of the LDO 100. Note that the DLDO regulating circuit 104 is not coupled to the ALDO regulating circuit 102 to receive the output voltage Vout of the LDO 100. The DLDO regulating circuit 104 assists the ALDO regulating circuit 102 without directly referring to the value of the output voltage Vout of the LDO 100.

In this manner, the target of the DLDO regulating circuit 104 is to lock the ALDO regulating circuit 102 to the desired operation point, rather than locking the output voltage Vout of the entire LDO regulator 100 to a reference voltage (Vref hereinafter). The output voltage Vout is locked to the reference voltage Vref by the ALDO regulating circuit 102.

Figure 2:
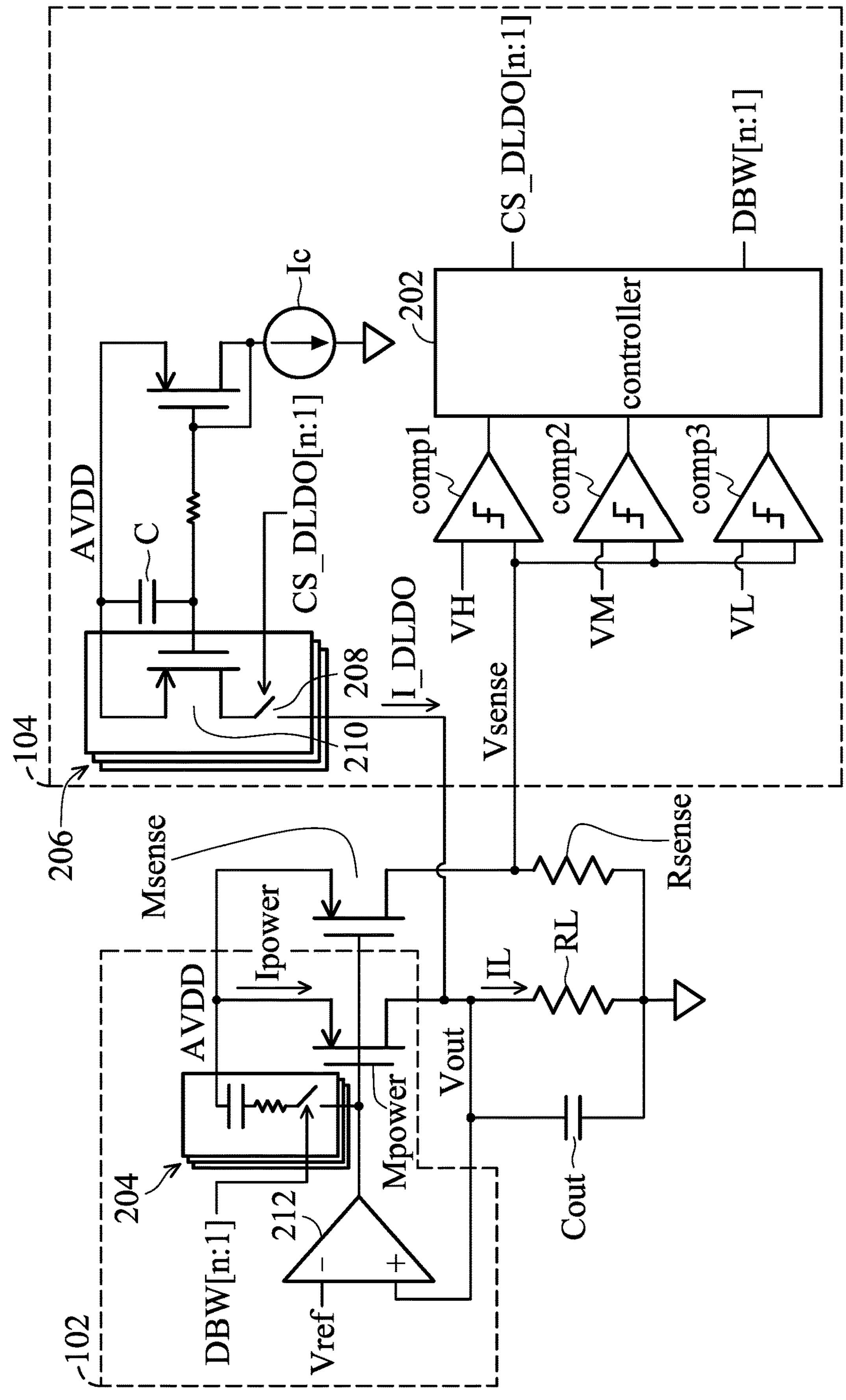
FIG. 2 depicts the details of the LDO 100 in accordance with an exemplary embodiment of the present invention.

FIG. 2 depicts the details of the LDO 100 in accordance with an exemplary embodiment of the present invention.

As shown, the ALDO regulating circuit 102 has a power MOS (e.g., a P-type Metal-Oxide-Semiconductor transistor) Mpower coupled between the voltage source AVDD and the output terminal (Vout) of the low-dropout regulator. There is a current-sensing MOS Msense and a current-sensing resistor Rsense for sensing the current Ipower of the power MOS Mpower. The current-sensing MOS Msense has a source terminal coupled to a source terminal of the power MOS Mpower, and a gate terminal coupled to a gate terminal of the power MOS Mpower. The current-sensing resistor Rsense is coupled at the drain terminal of the current-sensing MOS Msense. A connection terminal between the current-sensing MOS Msense and the current-sensing resistor Rsense is coupled to the DLDO regulating circuit 104 to provide a sensed voltage Vsense to the DLDO regulating circuit 104. The sensed voltage Vsense means that the current flowing through the current-sensing MOS Msense is Vsense/Rsense. Because the size of the power MOS Mpower and the size of the current-sensing MOS Msense are in a ratio of M:1 (where M is a number), the current, Vsense/Rsense, is 1/M the current Ipower of the power MOS Mpower. It means that the sensed voltage Vsense includes information about the current Ipower of the power MOS Mpower. The current Ipower is one kind of operating information of the ALDO regulating circuit 102. The DLDO regulating circuit 104, thus, assists the ALDO regulating circuit 102 based on the current Ipower of the power MOS Mpower of the ALDO regulating circuit 102, rather than on the entire LDO regulator's output voltage Vout. The DLDO regulating circuit 104 is capable of locking the ALDO regulating circuit 102 to the desired operation point.

In an exemplary embodiment, the DLDO regulating circuit 104 may use more criteria to determine whether the ALDO regulating circuit 102 operates around its desired operational point.

In FIG. 2, the DLDO regulating circuit 104 has a controller 202, and three comparators comp1, comp2, and comp3. The first comparator comp1 compares the sensed voltage Vsense with an upper limit voltage VH, and has an output terminal coupled to the controller 202. The second comparator comp2 compares the sensed voltage Vsense with a medium threshold voltage VM, and has an output terminal coupled to the controller 202. The third comparator comp3 compares the sensed voltage Vsense with the lower limit voltage VL, and has an output terminal coupled to the controller 202. The upper limit voltage VH is higher than the medium threshold voltage VM, and the medium threshold voltage VM is higher than the lower limit voltage VL. According to the comparison result, the controller 202 generates DLDO control bits CS_DLDO[n:1] to reinforce or to weaken the DLDO regulating circuit 104 to provide more current I_DLDO or less current I_DLDO to the load RL.

In an exemplary embodiment, when the first comparator comp1 shows that the sensed voltage Vsense exceeds the upper limit voltage VH, the controller 202 starts to use the DLDO control bits CS_DLDO[n:1] to control the DLDO regulating circuit 104 to modify the current I_DLDO (e.g., to reinforce the DLDO regulating circuit 104 to increase the current I_DLDO in response to the great current IL detected from the great Vsense), and changes to operate according to the second comparator comp2 (with the disabled comp1 and comp3). Once the second comparator comp2 determines that the sensed voltage Vsense has been pulled down to the medium threshold voltage VM, the controller 202 stops changing the DLDO control bits CS_DLDO[n:1]. The current I_DLDO keeps its level, and the controller 202 changes to operate according to the first and third comparators comp1 and comp3 to monitor the sensed voltage Vsense based on the upper limit voltage VH and the lower limit voltage VL.

In an exemplary embodiment, when the third comparator comp3 shows that the sensed voltage Vsense drops lower than the lower limit voltage VL, the controller 202 starts to use the DLDO control bits CS_DLDO[n:1] to control the DLDO regulating circuit 104 to modify the current I_DLDO (e.g., to weaken the DLDO regulating circuit 104 to decrease the current I_DLDO in response to the low current IL detected from the low Vsense). Then, the controller 202 changes to operate according to the second comparator comp2 (with the disabled comp1 and comp3). Once the second comparator comp2 determines that the sensed voltage Vsense is greater than the medium threshold voltage VM, the controller 202 stops changing the DLDO control bits CS_DLDO[n:1]. The current I_DLDO keeps its level, and the controller 202 changes to operate according to the first and third comparators comp1 and comp3 to monitor the sensed voltage Vsense based on the upper limit voltage VH and the lower limit voltage VL.

In this manner, before settling, the controller 202 operates according to a binary decision (e.g., greater than VM or not greater than VM). After settling, the controller 202 operates according to a tri-state decision (e.g., made according to the three thresholds VH, VM, and VL). The additional criterion, VM, helps the ALDO regulating circuit 102 to operate around its desired operational point. The sensed voltage Vsense is usually kept around the medium threshold voltage VM. The DLOD regulating circuit 104, therefore, is protected from frequently changing the current I_DLDO. It is power saving.

In FIG. 2, the ALDO regulating circuit 102 has a capacitor array 204 that provides an adaptive capacitance between the voltage source AVDD and a gate terminal of the power MOS Mpower. As shown, the controller 202 generates bandwidth (BW) control bits DBW[n:1] to control the capacitance of the capacitor array 204. The BW control bits DBW[n:1] also depend on the comparison result of the sensed voltage Vsense. For example, while the level determination of the sensed voltage Vsense makes more bits of the DLDO control bits CS_DLDO[n:1] asserted, more bits of the BW control bits DBW[n:1] may be de-asserted. Under the control of the DLDO control bits CS_DLDO[n:1] and the BW control bits DBW[n:1], the greater the current I_DLDO is, the smaller the capacitance that the capacitor array 204 provides between the voltage source AVDD and the gate terminal of the power MOS Mpower.

In such a design, to drive a heavy load, the load current IL is mainly provided by the DLDO regulating circuit 104 (providing I_DLDO), and the feedforward RC of the ALDO regulating circuit 102 (due to the capacitor array 204) is reduced. The interference from the ALDO regulating circuit 102 is negligible. The bandwidth of the ALDO regulating circuit 102 is increased due to the low feedforward RC.

As for driving a light load, the small load current IL is mainly provided by the ALDO regulating circuit 102 (providing Ipower), and the feedforward RC of the ALDO regulating circuit 102 (due to the capacitor array 204) is enlarged. The low current does not need a wide bandwidth, and so that the low bandwidth due to the high feedforward RC can work well. In addition, the whole LDO regulator may benefit from the good PSRR due to the high feedforward RC.

Furthermore, the DLDO regulating circuit 104 has an array of power switches (referring to the power switches 208 in the circuit array 206) which passes the adaptive current I_DLDO to the load RL. Each power switch 208 is coupled to a PMOS 210 that mirrors a constant current Ic to the corresponding power switch 208. Specifically, the DLDO regulating circuit 104 further has a capacitor C coupled between the voltage source AVDD and gate terminals of the PMOSs 210. Because of the large RC between the voltage source AVDD and the gate terminal of the PMOSs 210, the DLDO regulating circuit 104 may have a good PSRR.

Furthermore, the ALDO regulating circuit 102 has an operational amplifier 212, having a negative input terminal '−' receiving the reference voltage Vref, a positive input terminal '+' receiving the output voltage Vout, and an output terminal coupled to the gate terminal of the power MOS Mpower. This structure helps the ALDO regulating circuit 102 to lock the output voltage Vout to the reference voltage Vref.

Figure 3:
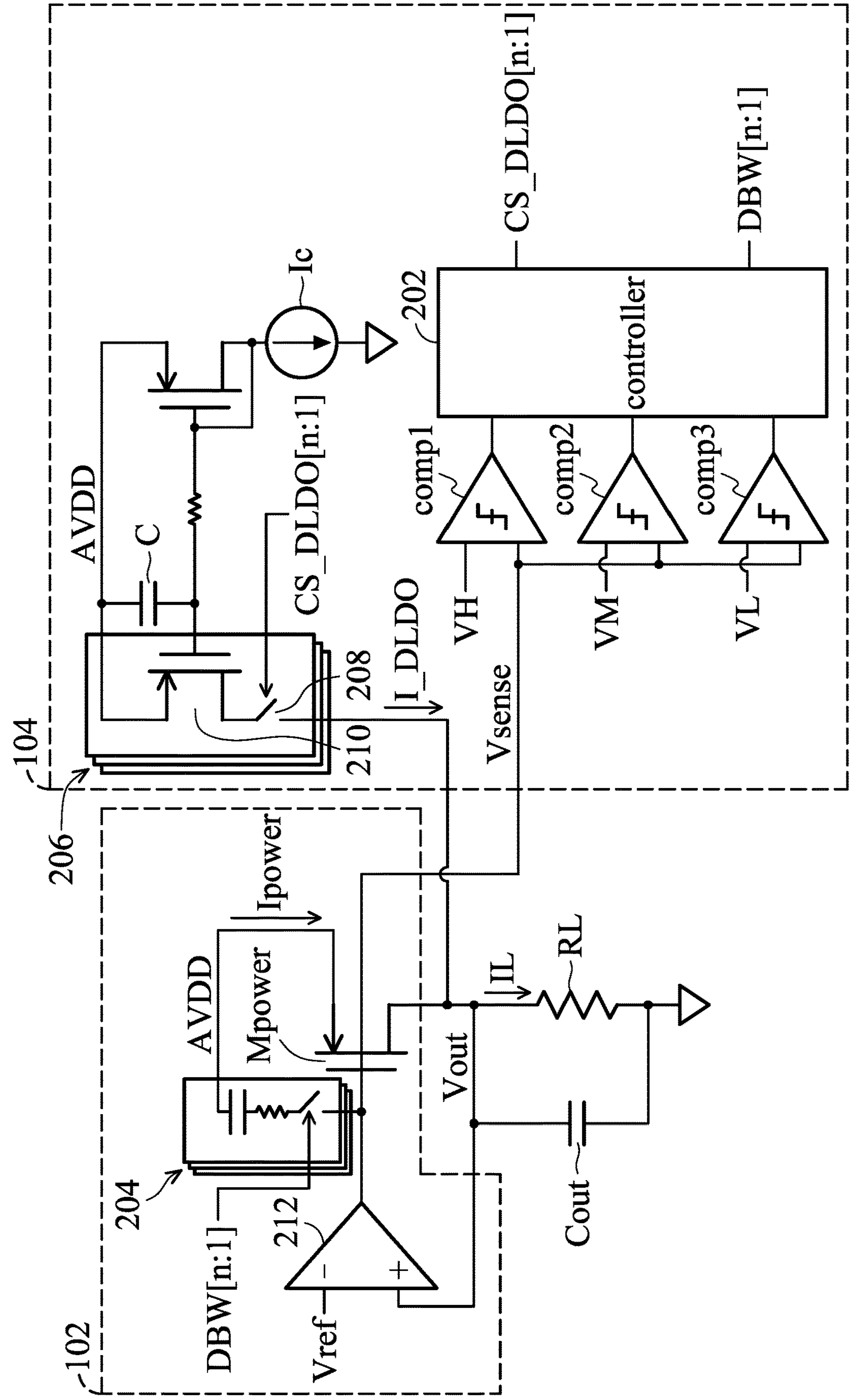
FIG. 3 depicts an LDO regulator in accordance with another exemplary embodiment of the present invention, wherein the DLDO regulating circuit 104 senses the gate voltage of the power MOS Mpower of the ALDO regulating circuit 102 as the sensed voltage Vsense, and assists the ALDO regulating circuit 102 based on the sensed voltage Vsense.

In some exemplar embodiments, the operating information of the ALDO regulating circuit 102 is obtained from the gate voltage of a power MOS Mpower of the ALDO regulating circuit 102. FIG. 3 depicts an LDO regulator in accordance with another exemplary embodiment of the present invention. The DLDO regulating circuit 104 senses the gate voltage of the power MOS Mpower of the ALDO regulating circuit 102 as the sensed voltage Vsense, and assists the ALDO regulating circuit 102 based on the sensed voltage Vsense.

Figure 4:
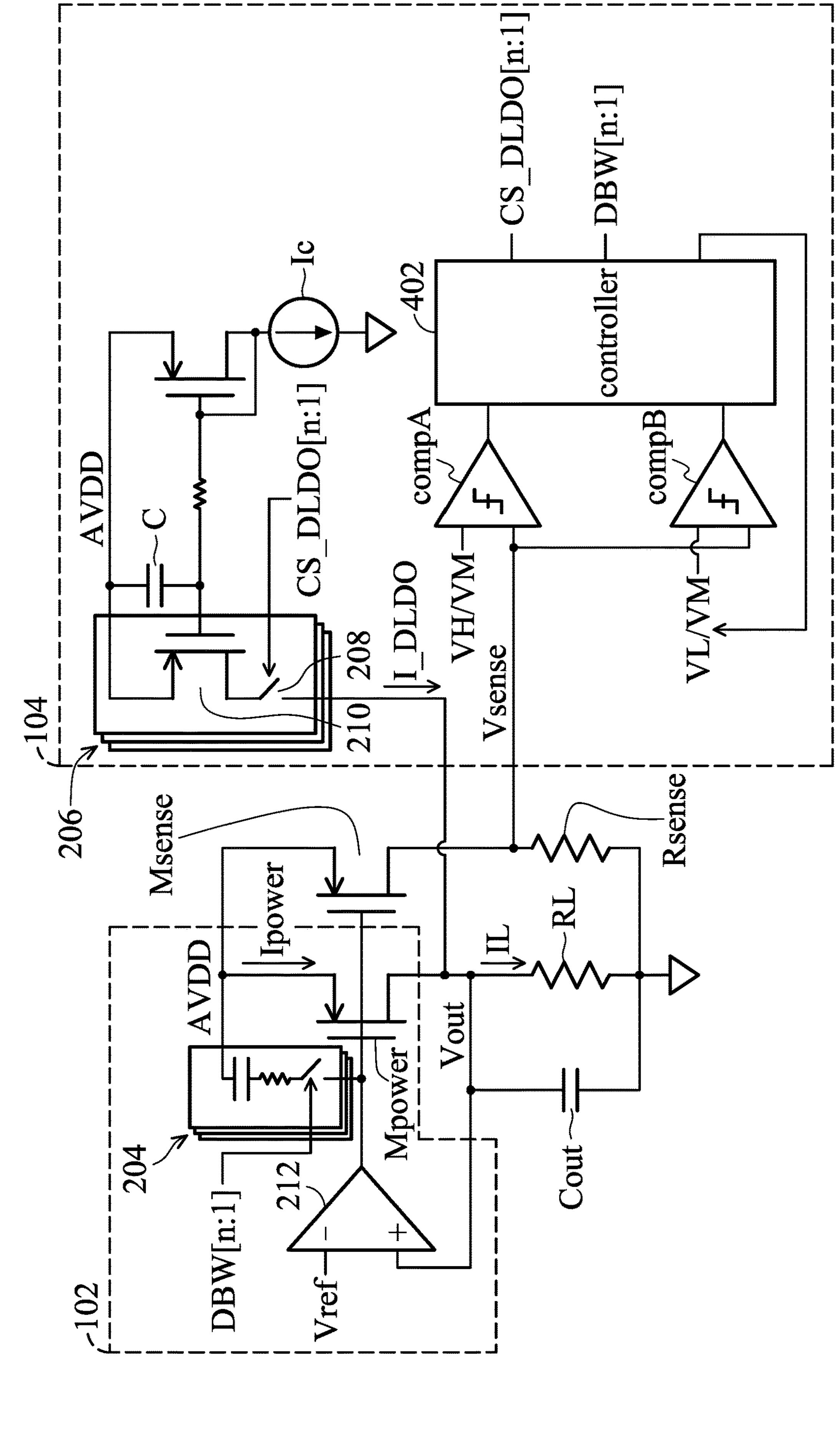
FIG. 4 depicts an LDO regulator in accordance with another exemplary embodiment of the present invention, which uses two comparators compA and compB rather than the three comparators comp1~comp3 of FIG. 2.

FIG. 4 depicts an LDO regulator in accordance with another exemplary embodiment of the present invention. In comparison with FIG. 2, the DLDO regulating circuit 104 of FIG. 4 uses two comparators compA and compB rather than the three comparators comp1~comp3 of FIG. 2. The first comparator compA compares the sensed voltage Vsense with the upper limit voltage VH in a first mode, and compares the sensed voltage Vsense with the medium threshold voltage VM in a second mode. The second comparator compB compares the sensed voltage Vsense with the lower limit voltage VL in a first mode, and compares the sensed voltage Vsense with the medium threshold voltage VM in a second mode. The output terminals of the comparators compA and compB are coupled to the controller 402.

When the first comparator compA in its first mode (comparing Vsense with VH) shows that the sensed voltage Vsense exceeds the upper limit voltage VH, the controller 402 changes the first comparator compA to its second mode (comparing Vsense with VM). When the first comparator compA in its second mode (comparing Vsense with VM) shows that the sensed voltage Vsense has been regulated to the medium threshold voltage VM, the controller 402 changes the first comparator Vsense back to its first mode (comparing Vsense with VH).

When the second comparator compB in its first mode (comparing Vsense with VL) shows that the sensed voltage Vsense drops lower than the lower limit voltage VL, the controller 402 changes the second comparator compB to its second mode (comparing Vsense with VM). When the second comparator compB in its second mode (comparing Vsense with VM) shows that the sensed voltage (comparing Vsense with VM) has been regulated to the medium threshold voltage VM, the controller 402 changes the second comparator compB back to its first mode (comparing Vsense with VL).

Based on the comparison result, when determining that the sensed voltage Vsense is greater than an upper limit voltage VH, the controller 402 reinforces the DLDO regulating circuit 104 to provide more current I_DLDO to the load RL until the sensed voltage Vsense is lower than the medium threshold voltage VM. When determining that the sensed voltage Vsense is lower than the lower limit voltage VL, the controller 402 weakens the DLDO regulating circuit 104 to provide the less current I_DLDO to the load RL until the sensed voltage Vsense is greater than the medium threshold voltage VM.

The comparators compA and compB shown in FIG. 4 can be also used in FIG. 3 to replace the comparators comp1~comp3.

Figure 5:
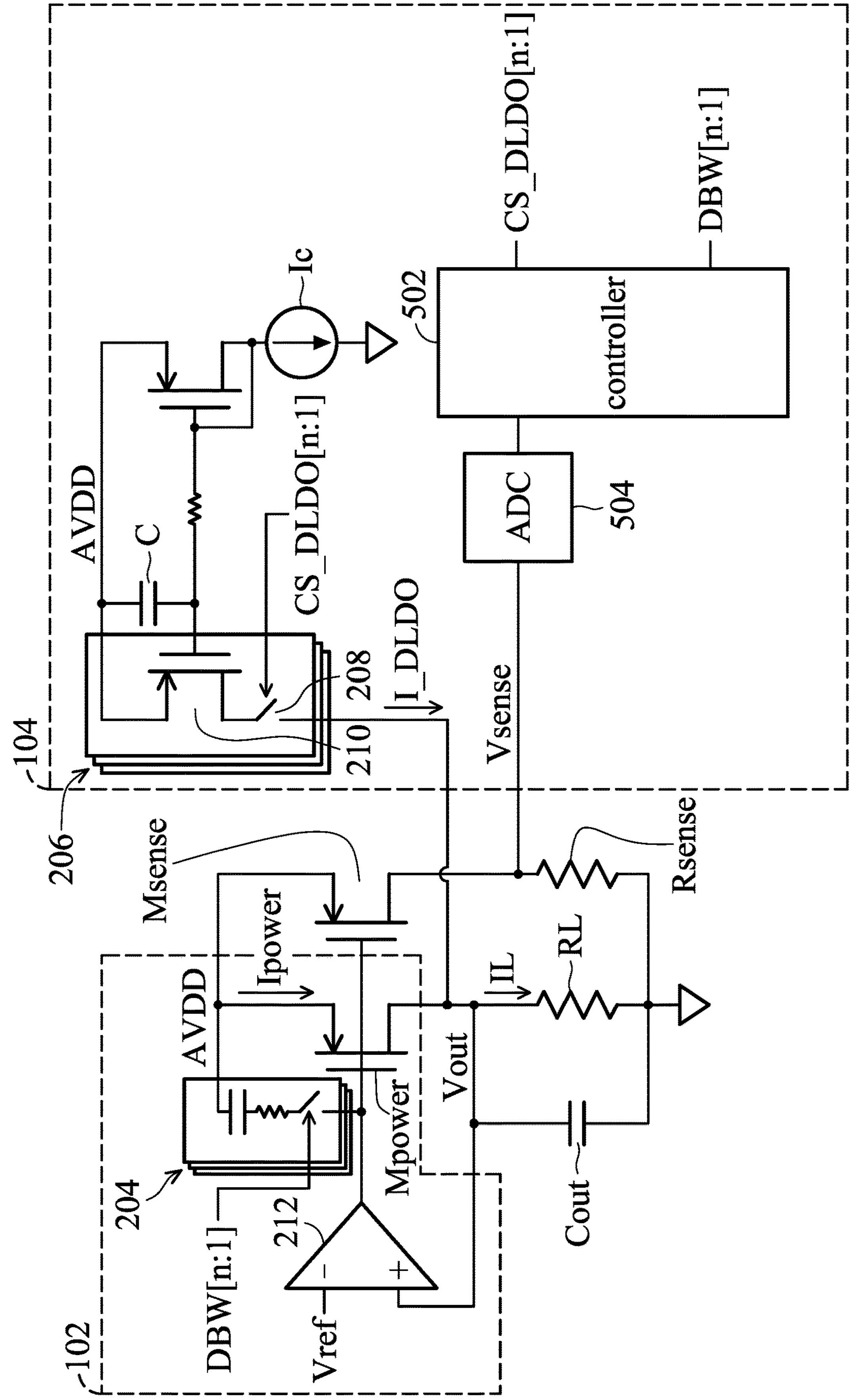
FIG. 5 depicts an LDO regulator in accordance with another exemplary embodiment of the present invention, which uses an ADC 504 rather than the three comparators comp1~comp3 of FIG. 2.

FIG. 5 depicts an LDO regulator in accordance with another exemplary embodiment of the present invention. In comparison with FIG. 2, the DLDO regulating circuit 104 of FIG. 5 has a controller 502 and an analog-to-digital converter (ADC) 504. The ADC 504 converts the sensed voltage Vsense into a digital code. According to the digital code, the controller 502 outputs the DLDO control bits CS_DLDO[n:1] to control the current I_DLDO that the DLDO regulating circuit 104 provides to the load RL, and outputs the BW control bits DBW[n:1] to control the capacitance that the capacitor array 204 provides between the voltage source AVDD and the gate terminal of the power MOS Mpower. The ADC 504 helps the controller 502 to determine whether the the ALDO regulating circuit 102 operates within its preferred operating region.

The ADC 504 shown in FIG. 5 can be also used in FIG. 3 to replace the comparators comp1~comp3.

Any LDO regulator using a DLDO regulating circuit to assist an ALDO regulating circuit and the DLDO regulating circuit operates according to the operating information of the ALDO regulating circuit rather than an output voltage of the whole LDO regulator should be considered within the scope of the present invention.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A low-dropout regulator, comprising:

an analog low-dropout regulating circuit; and a digital low-dropout regulating circuit, assisting the analog low-dropout regulating circuit;

wherein:

the digital low-dropout regulating circuit is coupled to the analog low-dropout regulating circuit, and the digital low-dropout regulating circuit senses operating information that shows if the analog low-dropout regulating circuit is within its operating region;

the digital low-dropout regulating circuit assists the analog low-dropout regulating circuit based on the operating information of the analog low-dropout regulating circuit instead of an output voltage at an output terminal of the low-dropout regulator;

the analog low-dropout regulating circuit has a capacitor array providing an adaptive capacitance between a voltage source and a gate terminal of a power MOS of the analog low-dropout regulating circuit; and the greater a current that the digital low-dropout regulating circuit provides to a load coupled to the output terminal of the low-dropout regulator, the smaller the capacitance that the capacitor array provides between the voltage source and the gate terminal of the power MOS.

2. The low-dropout regulator as claimed in claim 1, wherein:

the digital low-dropout regulating circuit senses a current of the power MOS of the analog low-dropout regulating circuit to assist the analog low-dropout regulating circuit based on the current of the power MOS of the analog low-dropout regulating circuit.

3. The low-dropout regulator as claimed in claim 2, further comprising:

a current-sensing MOS; and a current-sensing resistor;

wherein:

the current-sensing MOS has a source terminal coupled to a source terminal of the power MOS, and a gate terminal coupled to a gate terminal of the power MOS;

the current-sensing resistor is coupled at a drain terminal of the current-sensing MOS; and a connection terminal between the current-sensing MOS and the current-sensing resistor is coupled to the digital low-dropout regulating circuit and thereby the digital low-dropout regulating circuit senses the current of the power MOS.

4. The low-dropout regulator as claimed in claim 1, wherein:

the digital low-dropout regulating circuit senses a gate voltage of the power MOS of the analog low-dropout regulating circuit to assist the analog low-dropout regulating circuit based on the gate voltage of the power MOS of the analog low-dropout regulating circuit.

5. The low-dropout regulator as claimed in claim 1, wherein:

the digital low-dropout regulating circuit receives a sensed voltage that is the operating information that shows if the analog low-dropout regulating circuit is within its operating region;

the digital low-dropout regulating circuit has a controller;

when determining that the sensed voltage is greater than an upper limit voltage, the controller reinforces the digital low-dropout regulating circuit to provide more current to a load coupled to the output terminal of the low-dropout regulator until the sensed voltage is lower than a medium threshold voltage; and the medium threshold voltage is lower than the upper limit voltage.

6. The low-dropout regulator as claimed in claim 5, wherein:

when determining that the sensed voltage is lower than a lower limit voltage, the controller weakens the digital low-dropout regulating circuit to provide less current to the load until the sensed voltage is greater than the medium threshold voltage; and the medium threshold voltage is greater than the lower limit voltage.

7. The low-dropout regulator as claimed in claim 6, wherein the digital low-dropout regulating circuit further comprises:

a first comparator, comparing the sensed voltage with the upper limit voltage, and having an output terminal coupled to the controller;

a second comparator, comparing the sensed voltage with the medium threshold voltage, and having an output terminal coupled to the controller; and a third comparator, comparing the sensed voltage with the lower limit voltage, and having an output terminal coupled to the controller.

8. The low-dropout regulator as claimed in claim 7, wherein:

when the first comparator shows that the sensed voltage exceeds the upper limit voltage, the controller changes to operate according to the second comparator; and when the third comparator shows that the sensed voltage drops lower than the lower limit voltage, the controller changes to operate according to the second comparator; and when the second comparator shows that the sensed voltage has been regulated to the medium threshold voltage, the controller changes to operate according to the first and third comparators.

9. The low-dropout regulator as claimed in claim 6, wherein the digital low-dropout regulating circuit further comprises:

a first comparator, comparing the sensed voltage with the upper limit voltage in a first mode, and comparing the sensed voltage with the medium threshold voltage in a second mode, wherein the first comparator has an output terminal coupled to the controller; and a second comparator, comparing the sensed voltage with the lower limit voltage in a first mode, and comparing the sensed voltage with the medium threshold voltage in a second mode, wherein the second comparator has an output terminal coupled to the controller.

10. The low-dropout regulator as claimed in claim 9, wherein:

when the first comparator in its first mode shows that the sensed voltage exceeds the upper limit voltage, the controller changes the first comparator to its second mode;

when the second comparator in its first mode shows that the sensed voltage drops lower than the lower limit voltage, the controller changes the second comparator to its second mode;

when the first comparator in its second mode shows that the sensed voltage has been regulated to the medium threshold voltage, the controller changes the first comparator back to its first mode; and when the second comparator in its second mode shows that the sensed voltage has been regulated to the medium threshold voltage, the controller changes the second comparator back to its first mode.

11. The low-dropout regulator as claimed in claim 1, wherein:

the digital low-dropout regulating circuit receives a sensed voltage that is the operating information that shows if the analog low-dropout regulating circuit is within its operating region;

the digital low-dropout regulating circuit has a controller and an analog-to-digital converter;

the analog-to-digital converter converts the sensed voltage into a digital code; and according to the digital code, the controller changes a current that the digital low-dropout regulating circuit provides to a load coupled to the output terminal of the low-dropout regulator.

12. The low-dropout regulator as claimed in claim 1, wherein:

the digital low-dropout regulating circuit has an array of power switches which passes an adaptive current to a load coupled to the output terminal of the low-dropout regulator, and each power switch is coupled to a PMOS that mirrors a constant current to the corresponding power switch.

13. The low-dropout regulator as claimed in claim 12, wherein:

the digital low-dropout regulating circuit further has a capacitor coupled between the voltage source and gate terminals of the PMOSs.

14. The low-dropout regulator as claimed in claim 1, wherein:

the digital low-dropout regulating circuit has an array of power switches which passes an adaptive current to a load coupled to the output terminal of the low-dropout regulator;

the analog low-dropout regulating circuit has an operational amplifier, having a negative input terminal receiving a reference voltage, a positive input terminal receiving the output voltage, and an output terminal coupled to a gate terminal of the power MOS of the analog low-dropout regulating circuit; and the power MOS of the analog low-dropout regulating circuit is coupled between the voltage source and the output terminal of the low-dropout regulator.

* * * * *